United States Patent [19]
Lee

[11] Patent Number: 5,748,332
[45] Date of Patent: May 5, 1998

[54] VIDEO REPEAT REPRODUCTION METHOD AND APPARATUS

[75] Inventor: Yong-soo Lee, Seoul, Rep. of Korea

[73] Assignee: Samsung Electronics Co., Ltd., Kyungki-do, Rep. of Korea

[21] Appl. No.: 281,087

[22] Filed: Jul. 27, 1994

[30] Foreign Application Priority Data

Nov. 30, 1993 [KR] Rep. of Korea ............... 1993-25940

[51] Int. Cl.⁶ ......................................................... H04N 5/76
[52] U.S. Cl. .................................. 358/335; 360/72.1
[58] Field of Search .......................... 358/335, 312, 358/342, 341, 343, 311; 360/33.1, 72.1, 72.2

[56] References Cited

U.S. PATENT DOCUMENTS

| | | | |
|---|---|---|---|
| 4,224,644 | 9/1980 | Lewis et al. | 360/72.2 |
| 4,628,377 | 12/1986 | Harigaya | 360/72.1 |
| 5,206,929 | 4/1993 | Langford et al. | 358/311 |
| 5,276,560 | 1/1994 | Saito | 358/343 |
| 5,390,026 | 2/1995 | Lim | 358/335 |
| 5,390,027 | 2/1995 | Henmi et al. | 358/335 |
| 5,406,381 | 4/1995 | Han | 358/335 |
| 5,418,655 | 5/1995 | Yuki et al. | 360/72.2 |
| 5,450,210 | 9/1995 | Yoo | 358/335 |

*Primary Examiner*—Thai Q. Tran
*Assistant Examiner*—Huy Nguyen
*Attorney, Agent, or Firm*—Sughrue, Mion, Zinn, Macpeak & Seas

[57] ABSTRACT

A video repeat reproduction method and apparatus for use with a video recording and reproducing apparatus such as a video tape recorder, which employs predetermined signals to repeatedly reproduce a specific interval of a video signal. The method includes the steps of recording distinctive index signals respectively at the starting point and ending point of a desired repeat reproduction interval while displaying a reproduced picture, detecting the index signals which are recorded on the recording medium, displaying the detected index signals on a screen, and repeatedly reproducing the interval of the video signal on which the index signals have been recorded by a desired number of times if a repeat reproduction command is applied.

14 Claims, 6 Drawing Sheets

Index Data

Fig. 4

Index Search and Repetition
Input Screen

INDEX SEARCH __

REPEAT __

REW or FF

Fig. 5

VIDEO REPEAT REPRODUCTION METHOD AND APPARATUS

BACKGROUND OF THE INVENTION

The present invention relates to a video repeat reproduction method, and more particularly, to a method, using a microcomputer, for repeatedly reproducing an interval of a video signal, a desired number of times. Furthermore, the present invention also relates to an apparatus in which the video repeat reproduction method is applied. The present video repeat reproduction method is intended for use with a video recording and reproducing apparatus such as a video tape recorder (VTR) for recording and/or reproducing a video signal in which predetermined index signals are recorded on or erased from a specific interval of the recorded video signal, while displaying the recorded index signals via a screen. Thus, a user can easily determine which index signals are recorded to facilitate erasing unnecessary index signals.

The present invention provides a useful apparatus and method to allow a user to repeatedly reproduce a desired interval of a video tape. For example, persons studying a foreign language using a video tape recorder could use the present invention to easily reproduce a desired portion of the video tape a number of times in order to facilitate the user's studies.

In a conventional VTR, in order to repeatedly reproduce a desired portion of a video signal, a user first records an index signal at a start position of a desired interval of the video signal which is intended to be repeatedly reproduced. Then, if an index search command is input during reproduction of the video signal on which the index signal has been recorded, the VTR starts searching for the index signal. If the index signal is found, the search operation stops and a picture is reproduced for a predetermined amount of time, for example, about five seconds from the point where the index signal is recorded. Then, the user decides whether or not the reproduced picture corresponds to the interval intended to be repeatedly reproduced, that is, the repeat reproduction interval, to thereafter determine if the repeat reproduction function should be performed. Here, the repeat reproduction interval and the number of times for repeating the interval are manually specified by the user via direct key manipulation.

Such a conventional method has various defects, in that since a portion of the video signal where the index signal is recorded must be reproduced to determine whether or not the reproduced signal corresponds to the desired picture to be repeatedly reproduced, various index signals could unnecessarily be recorded within a narrow tape interval. Accordingly, the use of a conventional repeat reproduction mode in a VTR has been accompanied by various inconveniences to the user.

SUMMARY OF THE INVENTION

It is an object of the present invention to solve these problems by providing a method for conveniently and repeatedly reproducing a desired interval of a video signal using recorded index signals for representing a desired repeat reproduction interval. In particular, the index signals are displayed on a display screen and recorded on, or erased from the video signal when a user identifies the displayed index signal.

To accomplish the above object, there is provided a method for repeatedly reproducing a desired interval of a video signal among video signals recorded on a recording medium using a video recording and reproducing apparatus, the method comprising the steps of:

recording distinctive index signals respectively at a start point and an end point of a desired repeat reproduction interval while viewing a reproduced picture recorded in the reproduction interval;

detecting the index signals which are recorded on the recording medium and displaying the detected index signals; and repeatedly reproducing the interval on which the index signal has been recorded by a desired number of times if a repeat reproduction command is applied.

Another object of the present invention is to provide an apparatus to perform the above-described method for repeatedly reproducing a desired reproduction interval.

BRIEF DESCRIPTION OF THE DRAWINGS

Further features and advantages of the present invention will become more apparent from the following description, with reference being made to the accompanying drawings, described below, wherein a preferred embodiment of the present invention is clearly shown.

In the drawings.

DETAILED DESCRIPTION OF THE INVENTION

A preferable embodiment of the present invention is described below with reference to the accompanying drawings.

Figure 1:
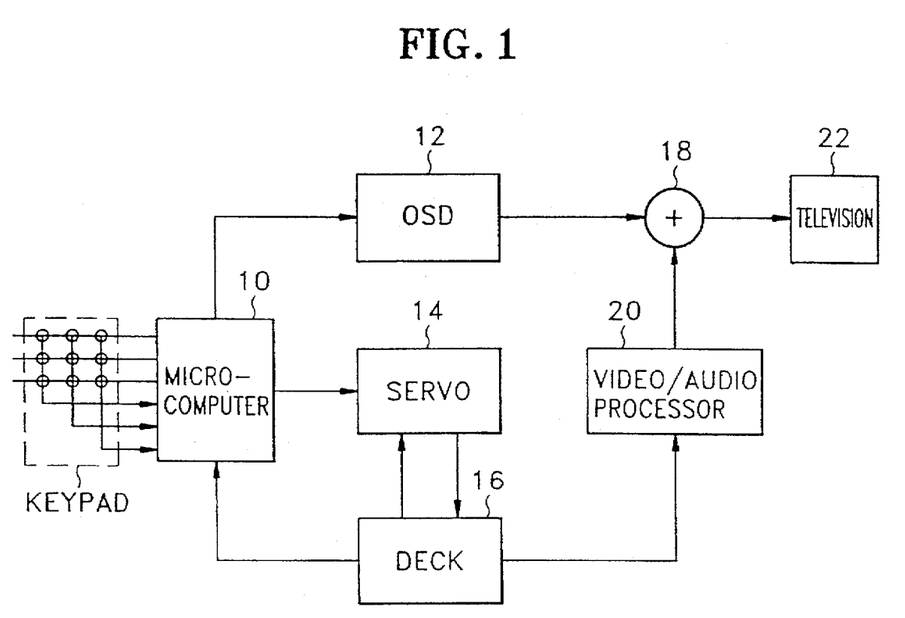
FIG. 1 is a block diagram showing a video repeat reproduction apparatus to which a video repeat reproduction method according to the present invention is adapted.

Referring to FIG. 1, which shows a video repeat reproduction apparatus to which a video repeat reproduction method according to the present invention is adapted, an operation of the video repeat reproduction apparatus is described below.

Microcomputer 10 scans the keypad to determine the value of an input key which the user has depressed, controls an on-screen display circuit (OSD) 12, controls a servo 14 to perform a record permission or a record prohibition function, and processes index signals which are supplied from a deck 16. The OSD 12 receives serial data from microcomputer 10, and supplies the received data to a television 22 via a mixer 18. Servo 14 receives control data with respect to the recording of the index signal from microcomputer 10 and controls the recording or erasing of the index signals onto or from a tape in deck 16. Deck 16 directly records the index signal on the tape and outputs a recording pulse to microcomputer 10. A video/audio signal processor 20 outputs reproduced video and audio information, which is recorded on the tape, for display via television 22. Mixer 18 mixes the output signals from OSD 12 and video/audio signal processor 20, and supplies the mixed signal to television 22.

Next, a video repeat reproduction method according to the present invention is described below.

As described above, since a conventional VTR does not display the recorded index signals on a screen, even though an index signal may have been input from deck portion 16 in the conventional VTR, a user could not identify the recorded index signal. Thus, a user could not erase unnecessary index signals since they could not be identified.

The present invention solves these problems by employing two types of index signals in a desired repeat reproduction interval to record a start position and an end position of a video signal interval that is to be repeatedly reproduced. A user can easily identify the recorded index signal via screen 12, and accordingly erase unnecessary index signals. The conventional method, in contrast, only employs one type of index signal to represent the start position of a repeat reproduction interval, and does not display the recorded index signals.

In the present invention, a first index signal for representing a start position of the repeat reproduction interval is recorded on the tape by servo 14 if microcomputer 10 supplies a recording permission signal to servo 14, similar to the conventional recording method. The first index signal is used to search for a starting position when an index search operation is performed. After starting reproduction at the location of the first index signal, microcomputer 10, checks for the presence of a second index signal recorded on the tape which represents an end position of the repeat reproduction interval. If the second index signal is found by microcomputer 10, a repeat counter value is checked. If the repeat counter value is "0," the device continues the general reproduction operation without repeating reproduction of the interval. If the repeat counter value is not "0," the medium is returned to the first index signal to again reproduce the indexed interval.

Figure 2A:
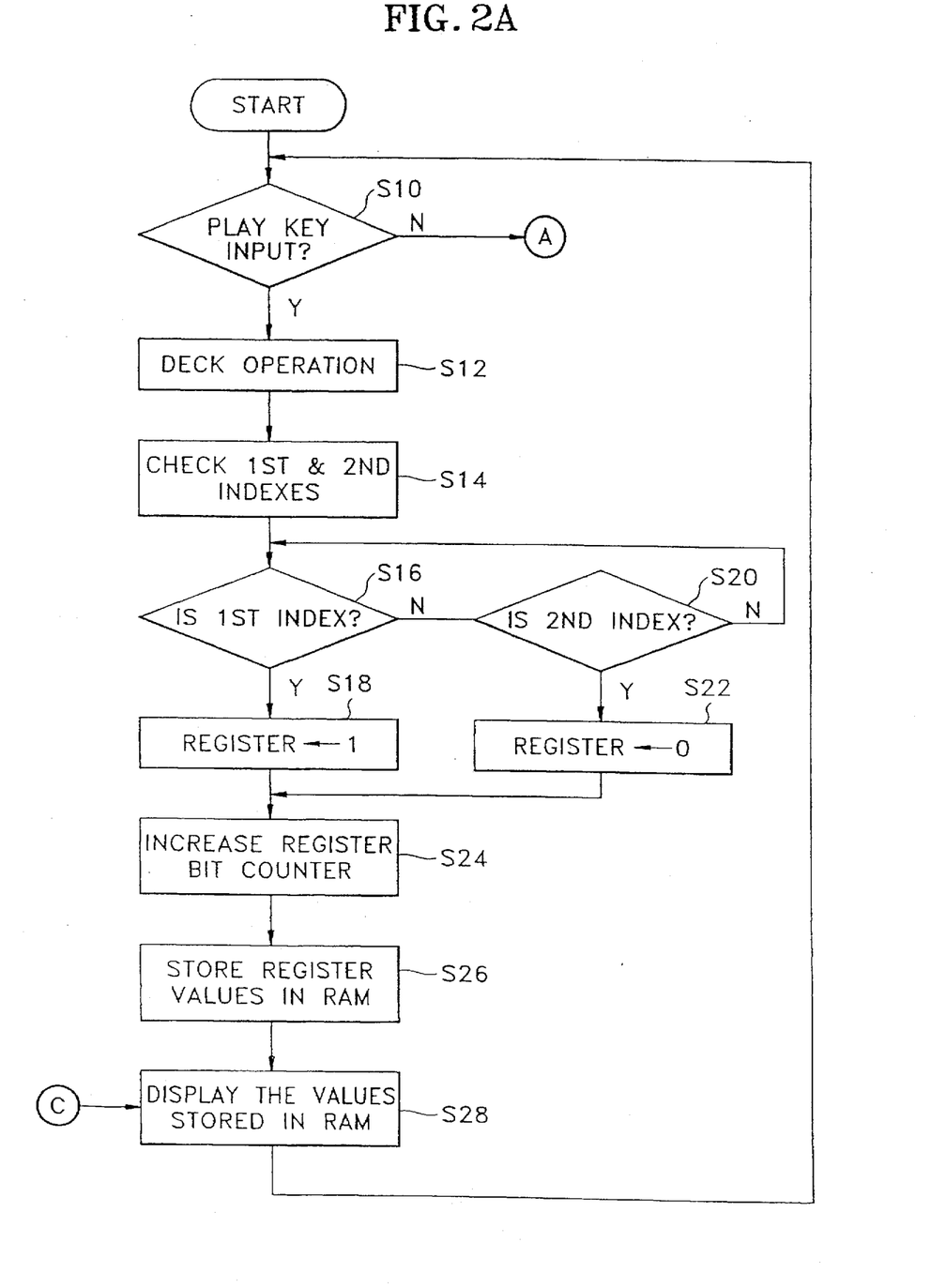
FIGS. 2A through 2C are flowchart diagrams of the video repeat reproduction method according to the present invention.
Figure 2B:
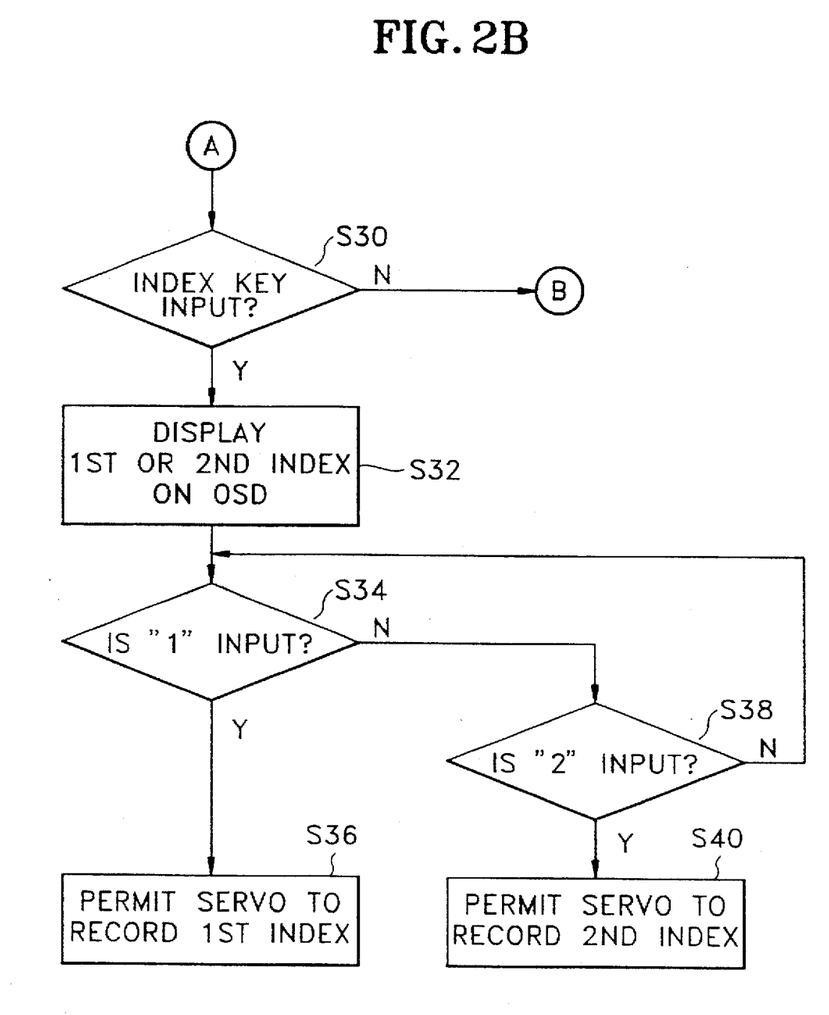
Figure 2C:
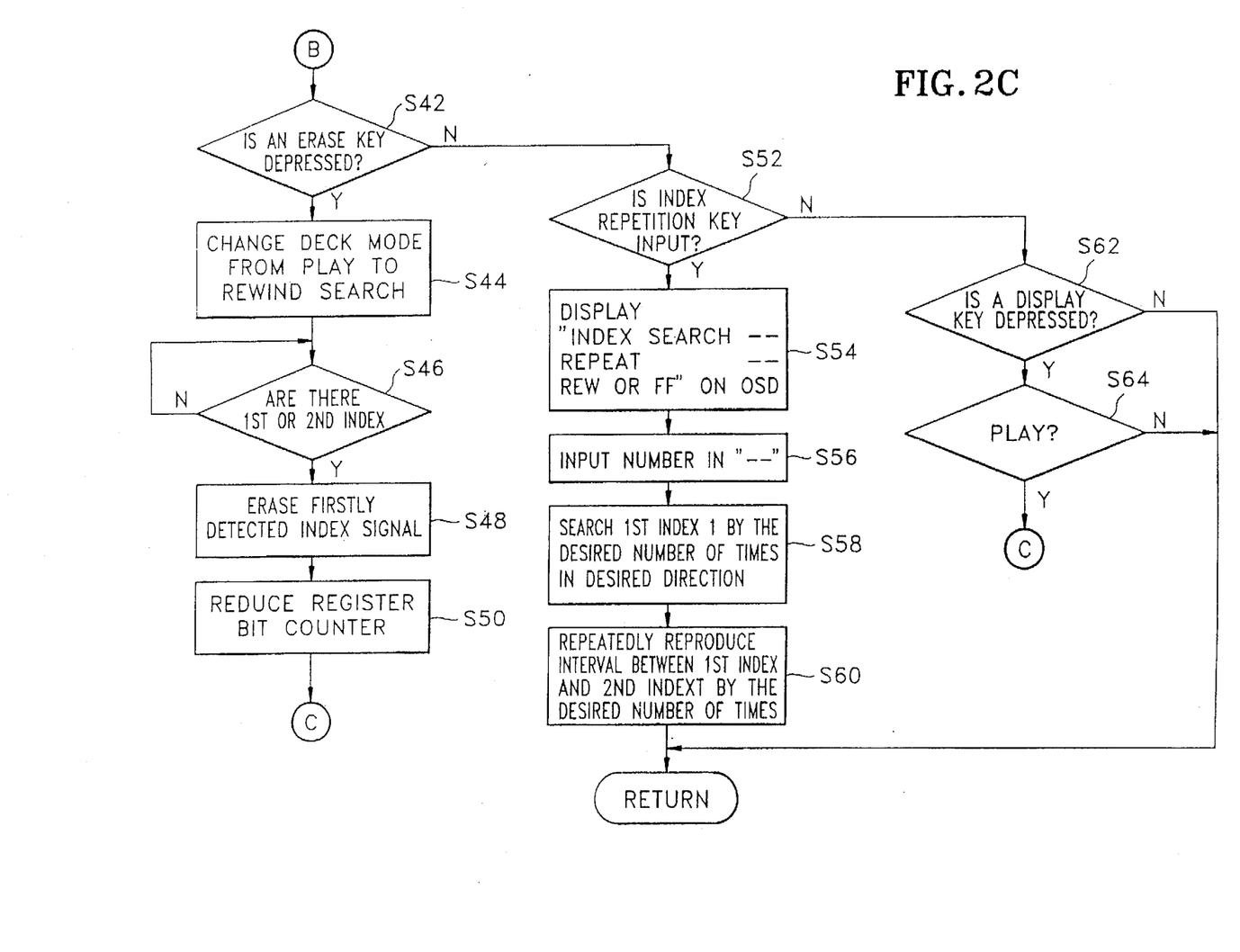
Figure 3A:
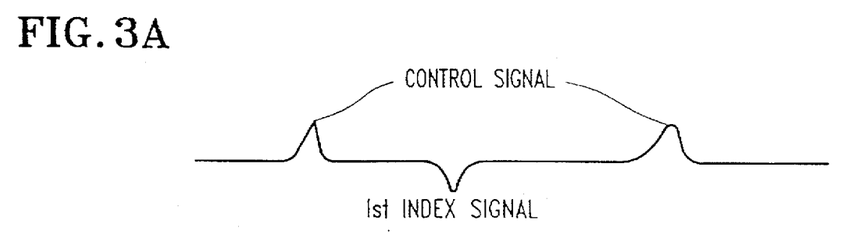
FIGS. 3A and 3B are waveform diagrams of video signals on which index signals are recorded.
Figure 3B:
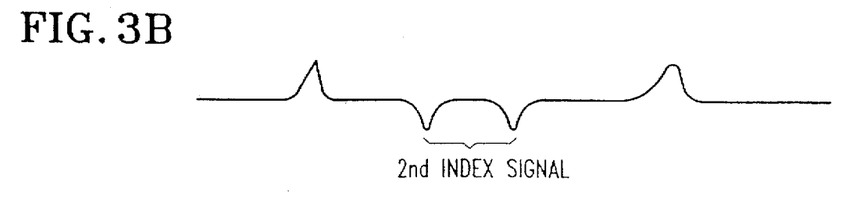

FIGS. 2A through 2C show flowchart diagrams of the video repeat reproduction method according to the present invention. FIGS. 3A and 3B are waveform diagrams of video signals on which index signals are recorded. Referring to FIGS. 2A through 2C and FIGS. 3A and 3B, the repeat reproduction method according to the present invention is described below.

First, a step for detecting the index signals that are recorded on the recording medium and displaying the detected index signals on the screen are described as follows.

Figure 4:
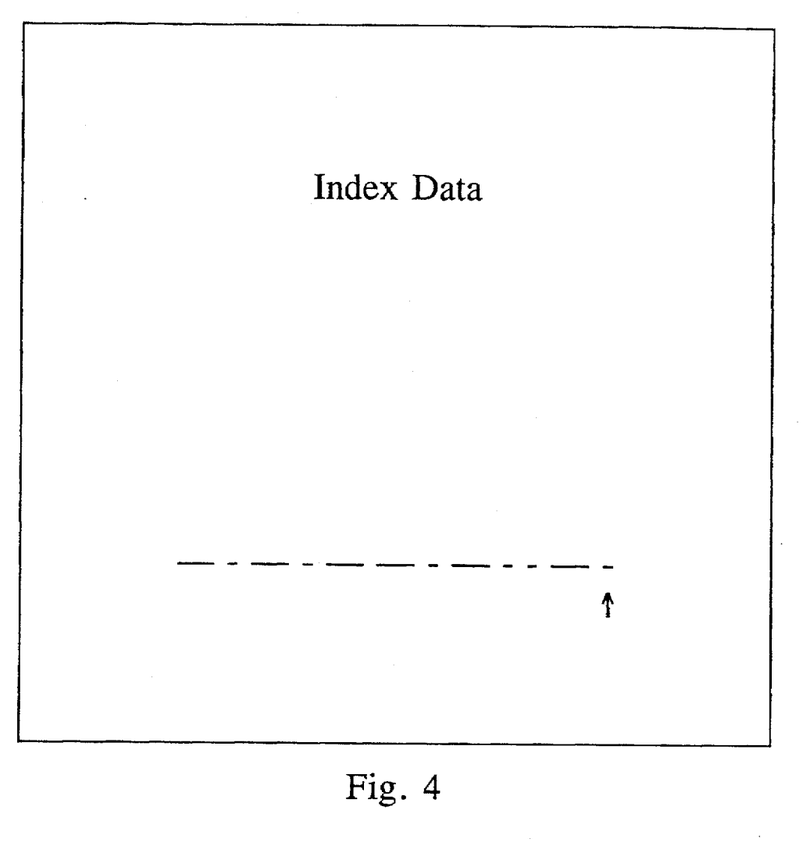
FIG. 4 shows an example of an index data display.

As shown in FIG. 2A, after a PLAY key is depressed (step S10) and the disk operates to reproduce the video signal (step S12), microcomputer 10 checks whether the first index signal and the second index signal are input from deck 16 in order to detect the recorded index signal. If the microcomputer 10 detects the index signal, it supplies the index display data, which relates to the detected indices and which is stored in temporary storage, to OSD 12 for a predetermined time, such as for one second (steps 10 through 28). FIG. 4 shows an example of the index data displayed on the screen; the long lines indicating a first index and the short lines indicating a second index. If a display instruction is input to microcomputer 10 when the index display data is not being displayed via OSD 12 after the predetermined time, the stored index display data is displayed (steps 62, 64 and 28).

In order to display the index data, a register and a random access memory (RAM) are used as a temporary storage device in microcomputer 10 to store the index display data. In this embodiment, the value of the index display data corresponding to a first index signal is "1" and that corresponding to a second index signal is "0". If a first index signal is detected, then a "1" is stored in the register as the current bit (steps 16 and 18). If a second index signal is detected, then a "0" is stored in the register (steps 20 and 22). Here, whenever an index signal is detected, the value held in a bit counter of the register is increased by one (step 24). At the same time the counter is incremented, the respective bits held in the register are stored in a 12-bit RAM according to the increased value in the bit counter. When the number of detected first and second index signals exceeds twelve, that is when the bit counter value equals twelve, the data displayed via the OSD are shifted so as to display the most current data. Usually, since a maximum of twelve index signals can be displayed on the screen of television 22, once the bit counter value equals thirteen, the contents of the register are shifted by one bit and the bit shifted out of the register is stored in the RAM to, accordingly, keep the bit counter value at twelve (step 26). Thereafter, the value stored in the RAM is read bit by bit to be displayed on the OSD screen. Here, the index display data supplied from microcomputer 10 to OSD 12 has a value of "0" or "1." Thus, any method capable of discriminating "1" and "0" is sufficient as the picture display method in OSD 12. For example, if the value stored as the bit value is "1," a long mark may be displayed while a short mark would be displayed if the value is "0" (step 28), as shown, for example, in FIG. 4.

Next, a step for recording distinct index signals at the start and end positions of the desired repeat reproduction interval while viewing the reproduced pictures, is described.

In FIG. 2B, if the index key is depressed (step 30) alphanumeric display data such as "index 1 or 2" is supplied to OSD 12 (step 32), which is displayed to the user. If the user inputs a value of "1" (step 34), microcomputer 10 supplies the recording permission signal to servo 14 to record the first index signal on the tape (step 36). If the user inputs a value of "2" (step 38), the second index signal is recorded on the tape (step 40). The first and second index signals that are recorded should be distinctive with respect to each other. As shown in FIGS. 3A and 3B, the index signals or mark signals can be recorded between control signals, such as capstan control signals, and have a polarity opposite that of the control signal. Here, the first index signal is represented as a single pulse signal and the second index signal is represented as two pulses. While a different number of pulses are employed for encoding the first and second index signals, the present invention is not limited to such an encoding method. As one of ordinary skill in the art would readily recognize other encoding schemes for encoding distinctive signals can be used without deviating form the scope of the present invention.

A step for repeatedly reproducing the interval on which the index signal is recorded, by a predetermined number of times if a repeat reproduction instruction is input, is described below.

In FIG. 2C, microcomputer 10 determines whether an index repetition key is depressed (step 52). If so, OSD 12 displays an input screen (step 54) having a message similar to that shown in FIG. 5.

Figure 5:
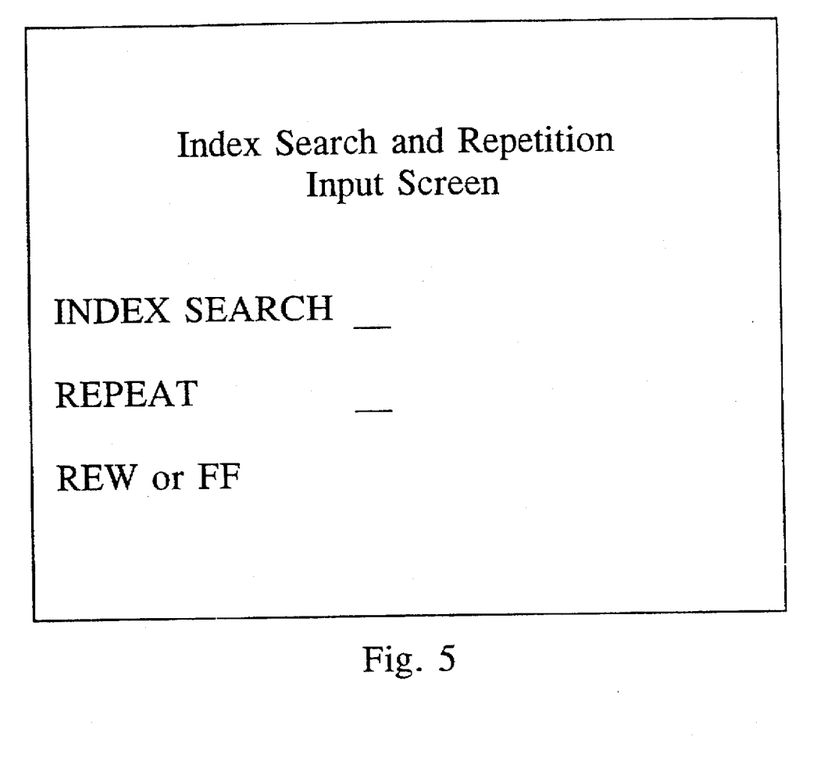
FIG. 5 shows an example of an index repetition input screen message.

If the user depresses a "REW" or "FF" key, after the user inputs the data, filling-in the blanks in the displayed picture (step 56), the medium is searched for the index signal in the corresponding direction. The index signal is searched for the number of times corresponding to the number of designated by "INDEX SEARCH" (step 58). For example, if "3" is entered in the INDEX SEARCH field, then the third index signal from the medium's present position, the corresponding forward or reverse direction, that appears detected. If the first index signal corresponding to the index number entered is detected, the interval between that first index signal and the corresponding second index signal is repeatedly reproduced by the designated number of times (step 60). For example, if 2 is entered for "REPEAT", then the detected interval is reproduced twice.

The repeat reproduction feature is further facilitated if another step is combined with the above steps, for searching the index signals and erasing the searched index signals upon receipt of an erasing instruction. In such an index erasing step, if the user depresses an erase key (step 42), a rewind operation is performed (step 44) to detect the preceding first and second index signals (step 46). Accordingly, that first detected index signal is erased (step 48), and the bit counter value of the register is simultaneously decreased by one. Alternatively, the corresponding second index signal can also be erased.

As described above, the video signal repeat reproduction method according to the present invention continuously checks the index signals during the reproduction operation and displays the index signal on a monitor whenever the index signal is detected. Accordingly, the recording of the necessary index signals and erasing of the unnecessary index signals can be facilitated. The intervals on which the index signals are recorded are searched to perform an automatic repeat reproduction, to thereby enable the efficient use of a repeat reproduction mode of a VTR.

What is claimed is:

1. A method for repeatedly reproducing a desired interval of a video signal recorded on a recording medium using a video recording and reproducing apparatus, said method comprising the steps of:

recording on the recording medium a first index signal at a start point and a second index signal at an end point of a desired repeat reproduction interval while displaying a reproduced picture, wherein said first and second index signals are distinct from one another;

detecting said first and second index signals recorded on the recording medium in said recording step and displaying both the detected first and second index signals on a screen; and repeatedly reproducing the interval on which said first and second index signals have been recorded by a desired number of times when a repeat reproduction command is applied.

2. A repeat reproduction method according to claim 1, further comprising the step of searching for one of said first and second index signals and erasing the searched for index signal if it is deemed unnecessary when an erasing instruction is applied.

3. A repeat reproduction method according to claim 1, wherein said recording step comprises the steps of:

determining whether an index signal recording command is applied;

displaying an input picture prompting for the inputting of index signal information; and recording said first index signal if a value representing the start point is input, and recording said second index signal if a value representing the end point is input.

4. A repeat reproduction method according to claim 3, wherein:

said index signals are recorded between a plurality of control pulses;

said first index signal is recorded as a single pulse; and said second index signal is recorded as more than one pulse.

5. A repeat reproduction method according to claim 4, wherein said index signals are recorded with a polarity opposite to that of said control pulses.

6. A repeat reproduction method according to claim 1, wherein said detecting step comprises the steps of:

detecting said first and second index signals recorded on the recording medium, during the play operation;

storing data corresponding to the detected first and second index signals; and displaying on a screen said data stored in said storing step corresponding to said detected first and second index signals.

7. A repeat reproduction method according to claim 6, wherein said storing step comprises the steps of:

incrementing a count of detected index signals;

storing a representation of the detected index signal in a storage device, when said count exceeds a predetermined number.

8. A repeat reproduction method according to claim 7, wherein said storage device is a random access memory.

9. A repeat reproduction method according to claim 1, wherein said repeatedly reproducing step comprises the steps of:

determining whether a repeat reproduction command is applied;

inputting data related to a desired repeat reproduction interval, a repeat value indicating the number of times for repeatedly reproducing the interval, and a search direction, by using the input picture;

applying the input data and searching the desired repeat reproduction interval by using the applied data to perform a repeat reproduction by the desired number of times.

10. A repeat reproduction method according to claim 9, wherein said step for inputting data further comprises the steps of:

displaying a screen prompting for entry of input data; and receiving input data entered according to the displayed prompts.

11. The method recited in claim 1, wherein data corresponding to said first and second index signals, respectively, are displayed at the same time on said screen in the displaying step.

12. An apparatus for repeatedly reproducing a desired interval of a video signal recorded on a recording medium, said apparatus comprising:

means for recording and reproducing a video signal and first and second index signals indicating start and end points respectively of the desired interval of the video signal, on a recording medium, wherein said first index signal is recorded at said start point of said interval and said second index point is recorded at said end point of said interval;

servo means for driving said means for recording and reproducing a video signal;

means for composing on-screen information;

mixing means for mixing an output from said means for recording and reproducing a video signal and an output from said means for composing on-screen information;

display means for displaying an output of said mixing means;

means for inputting information;

storage means for storing index information corresponding to said first and second index signals; and controller means for controlling the operation of the apparatus, wherein said controller means receives input data from said inputting means, receives index data from said means for recording and reproducing, controls said storage means to store said index information, outputs said index information to said means for composing on-screen information, and controls said servo means to repeatedly reproduce an interval of the recorded video signal based on said first and second index signals.

13. An apparatus for repeatedly reproducing a desired interval of a video signal recorded on a recording medium according to claim 12, wherein said storage means comprises:

detection means for detecting one of said first and second index signals recorded on the recording medium;

first storage means for storing index information for a predetermined number of detected index signals;

counter means for counting the number of detected index signals and shifting said index information stored in said first storage means when the number of detected index signals exceeds a predetermined value, such that one of said index information is shifted out of said first storage means; and second storage means for storing the detected index information shifted out of said first storage means.

14. An apparatus for repeatedly reproducing a desired interval of a video signal recorded on a recording medium according to claim 13, wherein said first storage means is a register; and said second storage means is a random access memory.

* * * * *